United States Patent
Sheverev et al.

(10) Patent No.: US 8,028,586 B2
(45) Date of Patent: *Oct. 4, 2011

(54) LOAD CELL AND SYSTEM FOR MEASURING FORCES BASED ON OPTICAL SPECTRA SHIFTS

(75) Inventors: Valery A. Sheverev, West Orange, NJ (US); Vadim Stepaniuk, Bloomfield, NJ (US)

(73) Assignee: Lenterra, Inc., West Orange, NJ (US)

( * ) Notice: Subject to any disclaimer, the term of this patent is extended or adjusted under 35 U.S.C. 154(b) by 190 days.

This patent is subject to a terminal disclaimer.

(21) Appl. No.: 12/464,547

(22) Filed: May 12, 2009

(65) Prior Publication Data

US 2009/0282928 A1    Nov. 19, 2009

Related U.S. Application Data

(60) Provisional application No. 61/052,695, filed on May 13, 2008.

(51) Int. Cl.
*G01L 1/24* (2006.01)
(52) U.S. Cl. ......................................................... 73/800
(58) Field of Classification Search ...................... 73/800
See application file for complete search history.

(56) References Cited

U.S. PATENT DOCUMENTS

| | | | |
|---|---|---|---|
| 4,464,928 A | 8/1984 | Dealy | |
| 5,438,879 A | 8/1995 | Reda | |
| 5,883,310 A | 3/1999 | Ho et al. | |
| 6,389,197 B1 | 5/2002 | Iltchenko et al. | |
| 6,426,796 B1 | 7/2002 | Pulliam et al. | |
| 7,701,586 B2 * | 4/2010 | Otugen et al. | 356/480 |
| 7,770,463 B2 * | 8/2010 | Sheverev et al. | 73/800 |
| 2003/0118075 A1 | 6/2003 | Schweiger et al. | |
| 2006/0071158 A1 * | 4/2006 | Van Der Spek | 250/227.14 |
| 2008/0158542 A1 | 7/2008 | Otugen et al. | |
| 2010/0326200 A1 * | 12/2010 | Sheverev et al. | 73/800 |

FOREIGN PATENT DOCUMENTS

| | | |
|---|---|---|
| DE | 4031941 C1 | 4/1991 |
| GB | 2329243 A | 3/1999 |

OTHER PUBLICATIONS

Javad Shajii, et al., A Microfabricated Floating-Element Shear Stress Sensor Using Wafer-Bonding Technology, Journal of Microelectromechancial Systems, vol. 1, No. 2, (Jun. 1962), pp. 89-94.

Martin A. Schmidt, et al., Design and Calibration of a Microfabricated Floating Element Shear Stress Sensor, IEEE Transaction on Electron Devices, vol. 35, No. 6, (Jun. 1988), pp. 750-757.

(Continued)

*Primary Examiner* — Max Noori
(74) *Attorney, Agent, or Firm* — Barley Snyder

(57) ABSTRACT

A load cell having an optical micro-resonator in a housing formed of high thermally conductive material. Upon application of a force to a surface of the housing, the micro-resonator is squeezed and changes in shape and refractive index, thereby changing the resonant frequency of the micro-resonator and causing a shift in the spectrum of wavelengths of light that is introduced to the micro-resonator. This shift in the spectrum of wavelengths is representative of the force applied to the housing of the load cell.

14 Claims, 9 Drawing Sheets

OTHER PUBLICATIONS

A. Padmanabhan, et al., Micromachined Sensors for Static and Dynamic Shear-Stress Measurements in Aerodynamic Flows, Transducers International Conference on Solid-State Sensors and Actuators, Chicago, Jun. 16-19, 1997, pp. 137-140.

Michael Kozhevnikov, et al., Optical Force Sensor Based on Whispering Gallery Mode Resonators, American Institute of Aeronautics and Astronautics, Polytechnic University, Brooklyn, NY 11201, pp. 1-10.

V.S. Ilchenko, et al., Strain-turnable High-Q Optical Microsphere Resonator, Optics Communications 145 (1998) pp. 86-90.

Jiang Zhe, et al., A Microfabricated Wall Shear-Stress Sensor With Capacitive Sensing, Journal of Microelectromechanical Systems, vol. 14, No. 1, (Feb. 2005), pp. 167-175.

Tal Carmon, et al. Wavelength-independent Coupler from Fiber to an On-Chip Cavity, Demonstrated Over an 850 nm Span, Optics Express, vol. 15, No. 12, (Jun. 11, 2007), pp. 77677-77681.

D. Fourguette, et al., An Optical MEMS-Based Shear Stress Sensor for High Reynolds Number Applications, American Institute of Aeronautics and Astronautics Inc., (2003), pp. 1-8.

* cited by examiner

US 8,028,586 B2

LOAD CELL AND SYSTEM FOR MEASURING FORCES BASED ON OPTICAL SPECTRA SHIFTS

CROSS REFERENCE TO RELATED APPLICATIONS

This application is a non-provisional application based on and claiming the priority of Provisional Application 61052,695 filed May 13, 2008.

FIELD OF THE INVENTION

The present invention relates, in general, to measuring mechanical forces (e.g., stress and shear) and, in particular, to a load cell for measuring such forces by determining the magnitude of a shift in an optical spectrum known as "whispering gallery modes" (WGM).

BACKGROUND OF THE INVENTION

The accurate measurement of mechanical forces remains a challenge in many industrial applications as well as in scientific research. Precise knowledge of mechanical forces is important in a wide range of industrial process applications, including weight monitoring, batch control, mixing, dosing and blending of liquids or solids. Use of load cells for measuring forces has increased in recent years and the requirement for the wider range of parameter fields has strengthened. In particular, the load cell must be capable of supporting high loads that can be caused, for example, by shock, high winds or vibration. It must be easy to install, calibrate and replace; and it must be as compact and lightweight as possible, while being sufficiently robust to withstand harsh operating conditions. However, the fundamental principle of existing load cells, the piezo-electrical strain gauge principle, has remained largely unaltered since this type of load cell was first used for aircraft weight and balance measurement in the 1930s. New principles of load cells are required to expand both the parameter field and range of applications for force sensors.

SUMMARY OF THE INVENTION

A load cell, constructed in accordance with the present invention, includes a base plate formed of a high thermally conductive material, a cover member formed of a high thermally conductive material and movable relative to the base plate in response to a force applied to the cover member, and an optical micro-resonator, disposed between and in intimate contact with the base plate and the cover member, that changes in shape, refractive index and resonant frequency in response to a force applied to the cover member. Also included in this load cell are optical carrier means for (a) introducing light having a spectrum of wavelengths to the optical micro-resonator, and (b) providing an indication of a shift in the spectrum of wavelengths of the light caused by a change in the resonant frequency of the optical micro-resonator.

DETAILED DESCRIPTION OF THE INVENTION

In describing the present invention, a distinction is made between stress forces and shear forces only for the purpose of indicating that a load cell, constructed in accordance with the present invention, is capable of sensing forces, such as forces due to weight, that are applied normal or substantially normal to a surface of the load cell (termed herein as "stress" forces) and forces, such as forces due to fluid flow, that are applied tangential or substantially tangential to a surface of the load cell (termed herein as "shear" forces).

Figure 1A:
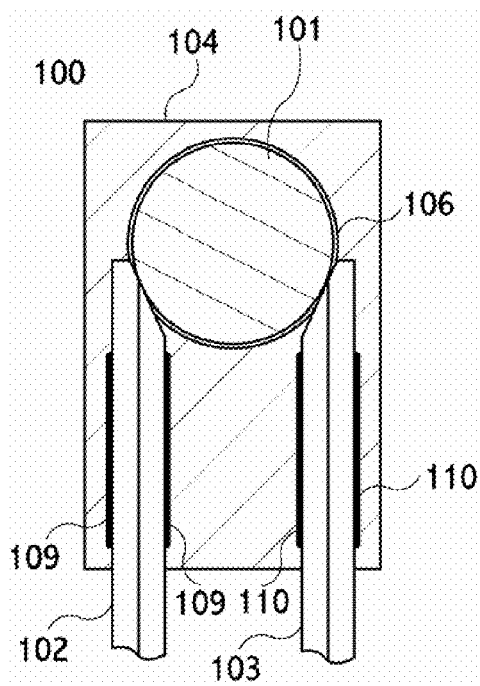
FIGS. 1A and 1B are cross-sectional views taken along planes at a right angle of a first embodiment of a load cell constructed in accordance with the present invention.
Figure 1B:
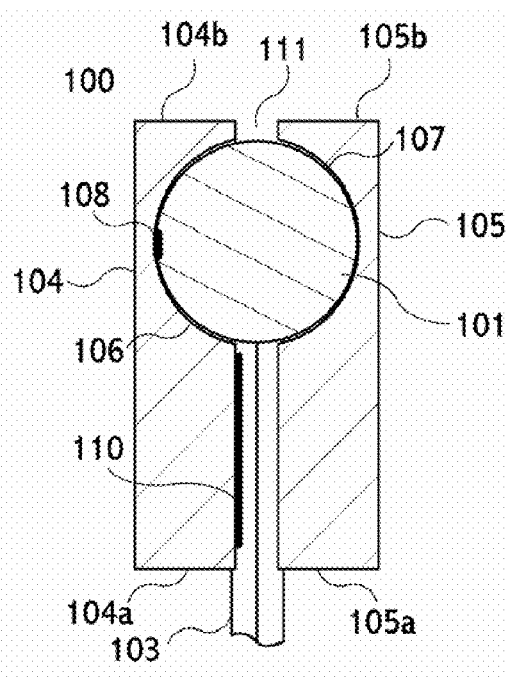

Referring to FIGS. 1A and 1B, a first embodiment of a load cell 100, constructed in accordance with the present invention, includes an optical micro-resonator 101, an input optical carrier 102 optically coupled to optical micro-resonator 101, and an output optical carrier 103 optically coupled to optical micro-resonator 101. Load cell 100 also includes a housing formed of high thermally conductive material that contains micro-resonator 101. The housing of the FIG. 1 load cell includes a base plate 104 having an inside surface that is in intimate contact with micro-resonator 101 and a cover member 105 having an inside surface that also is in intimate contact with the micro-resonator and an outside surface against which a force to be measured is applied.

Optical micro-resonator 101, disposed between base plate 104 and cover member 105, is positioned in an indentation 106 in the base plate and in an indentation 107 in the cover member 105. To prevent movement of optical micro-resonator 101, it may be secured to base plate 104 by suitable means, such as a small adhesive deposit 108. Similarly, input optical carrier 102 and output optical carrier 103 also can be secured to base plate 104 by small adhesive deposits 109 and 110.

Base plate 104 and cover member 105 are formed of a material of high thermal conductivity and are in intimate contact with optical micro-resonator 101 to eliminate entirely, or greatly reduce, the effects of ambient temperature on the measurements of forces applied to load cell 100. The effect of ambient temperature on the operation of load cell 100 is considered in greater detail below.

Optical micro-resonator 101 is of conventional construction and operation and changes in shape, refractive index and resonant frequency in response to a force applied to cover member 105. Optical micro-resonator can be made of glass, plastic or other material transparent to interrogation light that is introduced via input optical carrier 102 and can be a sphere, oblate spheroid, ring torus, disk, cylinder or other shape that supports optical resonances. Input optical carrier 102 and output optical carrier 103 can be angled polished fibers, such as the one illustrated in FIG. 1 of U.S. Pat. No. 6,389,197.

To minimize the footprint of load cell 100, input optical carrier 102 and output optical carrier 103 are arranged with those parts of the optical carriers outside base plate 104 and cover member 105 preferably on the same side of the load cell and parallel or near-parallel to each other. Base plate 104 and cover member 105 are secured together by suitable means so that optical micro-resonator 101 is firmly clamped between the base plate and the cover member. In particular, a first (lower) end 104a of base plate 104 is secured to a first (lower) end 105a of cover member 105 and a second (upper) end 104b of the base plate, opposite from first end 104a of the base plate, is spaced from a second (upper) end 105b of the cover member, opposite from first end 105a of the cover member. With this securing together of base plate 104 and cover member 105, there is a gap 111 between the upper end 104b of the base plate and the upper end 105b of the cover member that permits the cover member to move relative to the base plate. This movement is pivotal about the point at which the first end 104a of base plate 104 is secured to the first end 105a of cover member 105. Gap 111, between base plate 104 and cover member 105, may be left empty or may be filled in with a suitable flexible material to completely encapsulate load cell 100, while permitting relative movement between the base plate and the cover member.

In operation of load cell 100, when a force is applied, for example to cover member 105, normal to the side surface of the cover member, the cover member and base plate 104 squeeze optical micro-resonator 101. Interrogating light from a tunable narrowband source (considered below in connection with FIG. 6) passes through optical carrier 102 and is coupled to optical micro-resonator 101. Light emanating from optical micro-resonator 101 is coupled to output optical carrier 103 and passes through the output optical carrier to a detector (also considered below in connection with FIG. 6). The wavelength of the interrogating light is continuously ramped within a predetermined range and the spectrum (WGM) is recorded continuously by the detector. A change in the shape and refractive index of optical micro-resonator 101 alters the resonant frequency of the optical micro-resonator and this change is observed in the spectrum as a shift in the WGM. Variations in the radius of optical micro-resonator 101 as small as 0.01 nm can be detected. The shift in the WGM is related to the applied force using the known theoretical model or a calibration curve. Load cell 100 operates in a similar manner when a shear force is applied tangential to the top surface of end 105b of cover member 105.

The WGM force sensing technology is based on observing changes in the spectrum of a resonator that is subjected to the external force. Instead of using an open resonator, WGM employs dielectric micro-resonators (such as a glass sphere) with light captured inside. A minute change in the size, shape or refraction index of the micro-resonator alters the spectrum of the micro-resonator that is manifested as a shift in the resonant frequency of the micro-resonator, a change in the magnitude for a particular resonance, or in emergence of additional resonances in the spectrum. The micro-resonator spectrum can be measured, for example, by using a tunable laser and an optical detector. Usually, the shifts of the resonances are most practical to measure. Although operation of the various embodiments of the present invention that are disclosed is based on measuring the resonance shifts, the other features of the WGM spectra also can be employed in the present invention.

The optical resonances of WGM are extremely narrow. Thus, very small shifts of WGMs can be detected, which may be used for the precise measurements of the force causing the shifts (M. Kozhevnikov, T. Ioppolo, V. Stepaniuk, V. Sheverev and V. Otugen, "Optical Force Sensor Based on Whispering Gallery Mode Resonators," AIAA-2006-649, 44th AIAA Aerospace Sciences Meeting and Exhibit, Reno, Nev., Jan. 9-12, 2006). As indicated above, a change of a micro-sphere diameter as low as 0.01 nm can be detected by observing WGM shift (Ilchenko, V. S. et. al., "Strain-tunable high-Q optical microsphere resonator," Optics Communications, 1998. 145(1-6): p. 86-90). That provides an opportunity for designing an optical sensor with an extremely narrow gap 111 between base plate 104 and cover member 105. For example, for a gap of 100 nm that is not penetrable by any liquid, four orders of magnitude for the applied force can be measured. Another advantage of the WGM technology is a high quality factor that is manifested as dynamic range of the measurement. Quality factors as high as $10^9$ have been reported and at least five orders of the applied force measurement has been demonstrated experimentally using a silica glass microsphere as the micro-resonator.

In the above description of the operation of load cell 100, the mechanical force is applied to cover member 105 with base plate 104 anchored to prevent movement of the base plate. It is apparent that load cell 100 can be arranged to have the force applied to base plate 104 with cover member 105 anchored.

Figure 2A:
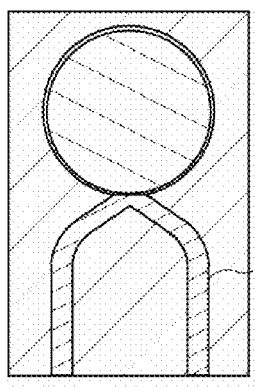
FIG. 2A is a cross-sectional view of a second embodiment of a load cell constructed in accordance with the present invention.
Figure 2B:
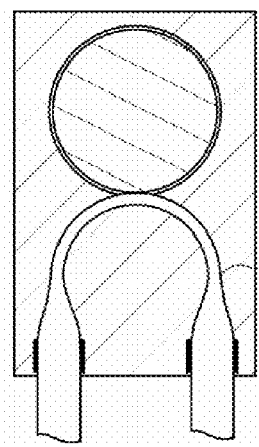
FIG. 2B is a cross-sectional view of a third embodiment of a load cell constructed in accordance with the present invention.
Figure 2C:
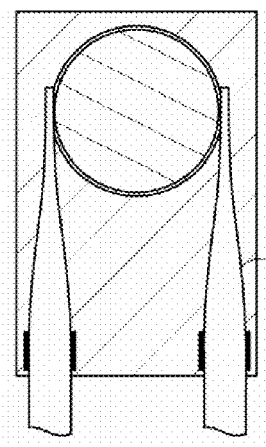
FIG. 2C is a cross-sectional view of a fourth embodiment of a load cell constructed in accordance with the present invention

The embodiments of the present invention, illustrated in FIG. 2A, 2B and 2C, differ from the embodiment of FIGS. 1A and 1B in the means by which interrogating light, from the tunable narrowband source, is introduced into optical micro-resonator 101 and light, emanating from the optical micro-resonator, passes to the detector. In FIG. 2A, these means are an optical waveguide 201; in FIG. 2B, these means are a bent tapered optical fiber 202; and in FIG. 2C, these means are two cut tapered optical fibers 203. The paper "Wavelength-length independent coupler from fiber to an on-chip cavity, demonstrated over 850 nm span" Tal Carmon, Steven Y. T. Wang, Eric P. Ostby and Kerry J. Vahala, *Optics Express*, 2007, v. 15, n. 12, pp. 7677-7681 describes both an optical waveguide and a tapered optical fiber that can serve to introduce interrogating light to optical micro-resonator 101 and pass light emanating from the optical micro-resonator to a detector.

Figure 3:
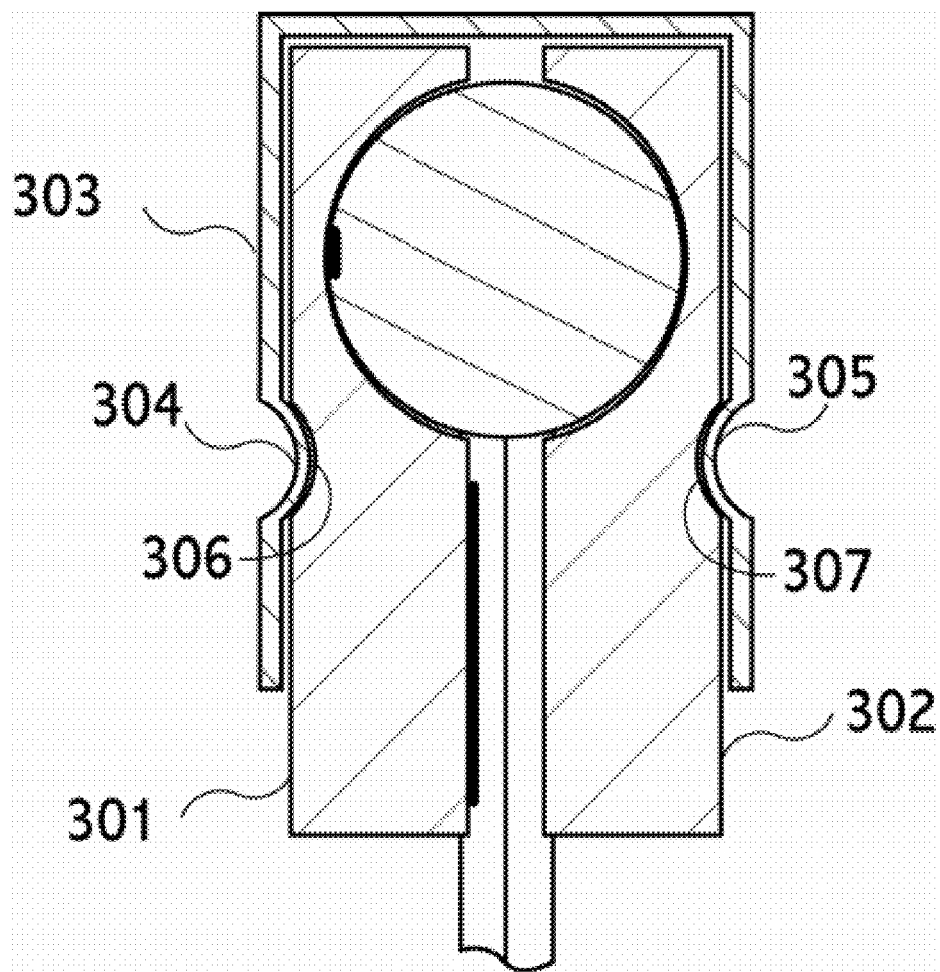
FIG. 3 is a cross-sectional view of a fifth embodiment of a load cell constructed in accordance with the present invention.

In the fifth embodiment of a load cell, constructed in accordance with the present invention and illustrated by FIG. 3, base plate 301 and cover member 302 are held together by an elastic clamp 303 that has two curved sections 304 and 305 that fit into corresponding recesses 306 and 307 in the side walls of the base plate and the cover member, respectively. In all other respects, the FIG. 3 embodiment of the present invention is constructed and operates in a manner similar to the embodiments of the present invention previously described.

Figure 4:
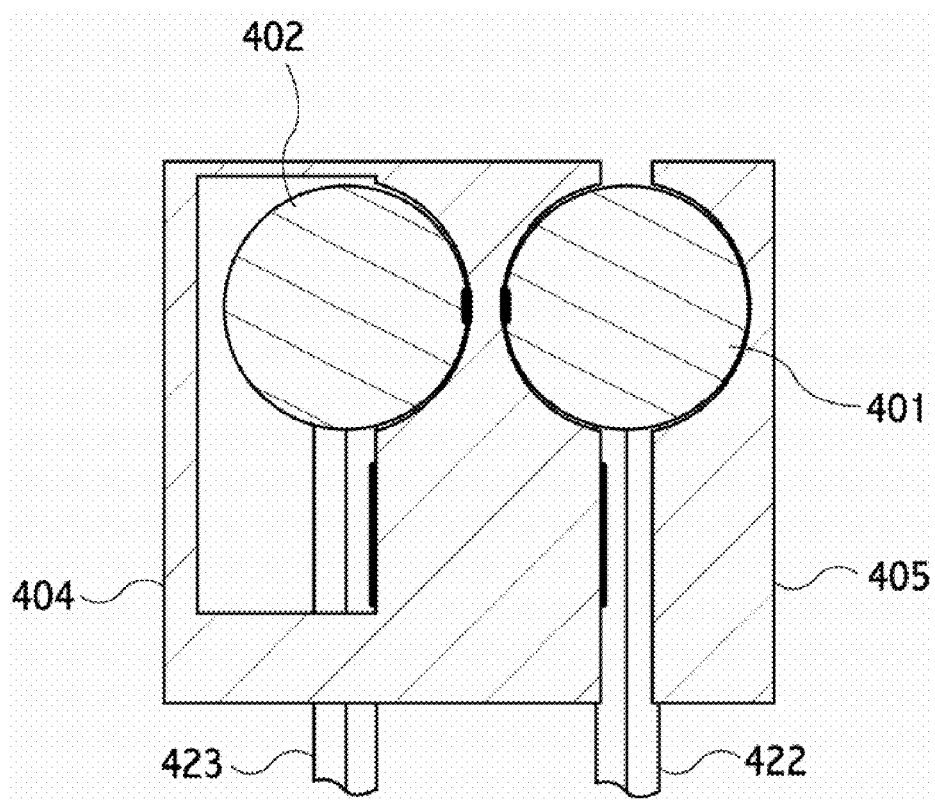
FIG. 4 is a cross-sectional view of a sixth embodiment of a load cell constructed in accordance with the present invention.

Referring to FIG. 4, which is a cross-sectional view of a sixth embodiment of a load cell constructed in accordance with the present invention, two optical micro-resonators 401 and 402 are included in the load cell. The two optical micro-resonators 401 and 402 are positioned in close proximity to each other, so that both are exposed to the same environmental temperature. Optical micro-resonator 402 is embedded in a base plate 404 and optical micro-resonator 401 is disposed between the base plate and a cover member 405.

First optical carrier means 422 introduce light having a spectrum of wavelengths to first optical micro-resonator 401 and provide an indication of a shift in the spectrum of wavelengths of the light caused by a change in the resonant frequency of the first optical micro-resonator. Second optical carrier means 423 introduce light having a spectrum of wavelengths to second optical micro-resonator 402 and provide an indication of a shift in the spectrum of wavelengths of the light caused by a change in the resonant frequency of the second optical micro-resonator. While optical micro-resonator 402 senses only the ambient temperature, micro-resonator 401 senses both an applied force and the temperature. The effect of temperature variations measured by micro-resonator 402 can be deducted from the shift in WGM spectra of micro-resonator 401. In this way, the compensated readings of the shift in WGM spectra of micro-resonator 401 will be accurate measurements of forces applied to the load cell. It will be understood that a thermocouple or other forms of temperature sensors may be used for environmental temperature compensation instead of an optical micro-resonator.

The temperature variations between any two points on the surface of a micro-resonator might also result in WGM shifts that are not related to an applied force. Therefore, it is advantageous, in the present invention, to encapsulate the micro-resonators with materials of high thermal conductivity and provide an intimate contact between these materials and the micro-resonator surface. For example, as illustrated in FIGS. 1A and 1B, micro-resonator 101 can be encapsulated by having base plate 104 and cover member 105, made of a metal or a high thermal conductivity plastic material, cover the entire micro-resonator surface, less a narrow strip around the micro-resonator equator plane determined by the optical carrier and the micro-resonator center. As a result, a substantial portion of the surface area of micro-resonator 101 is in direct intimate contact with base plate 104 and cover member 105.

To provide a uniform intimate contact between the surface of the micro-resonator and the base plate and the cover member in areas where the micro-resonator and the base plate and the cover member are not in direct intimate contact, an additional thermally conductive material, such as a a thermally conductive polymer, may be placed between the surface of the micro-resonator and the base plate and the cover member.

Figure 5:
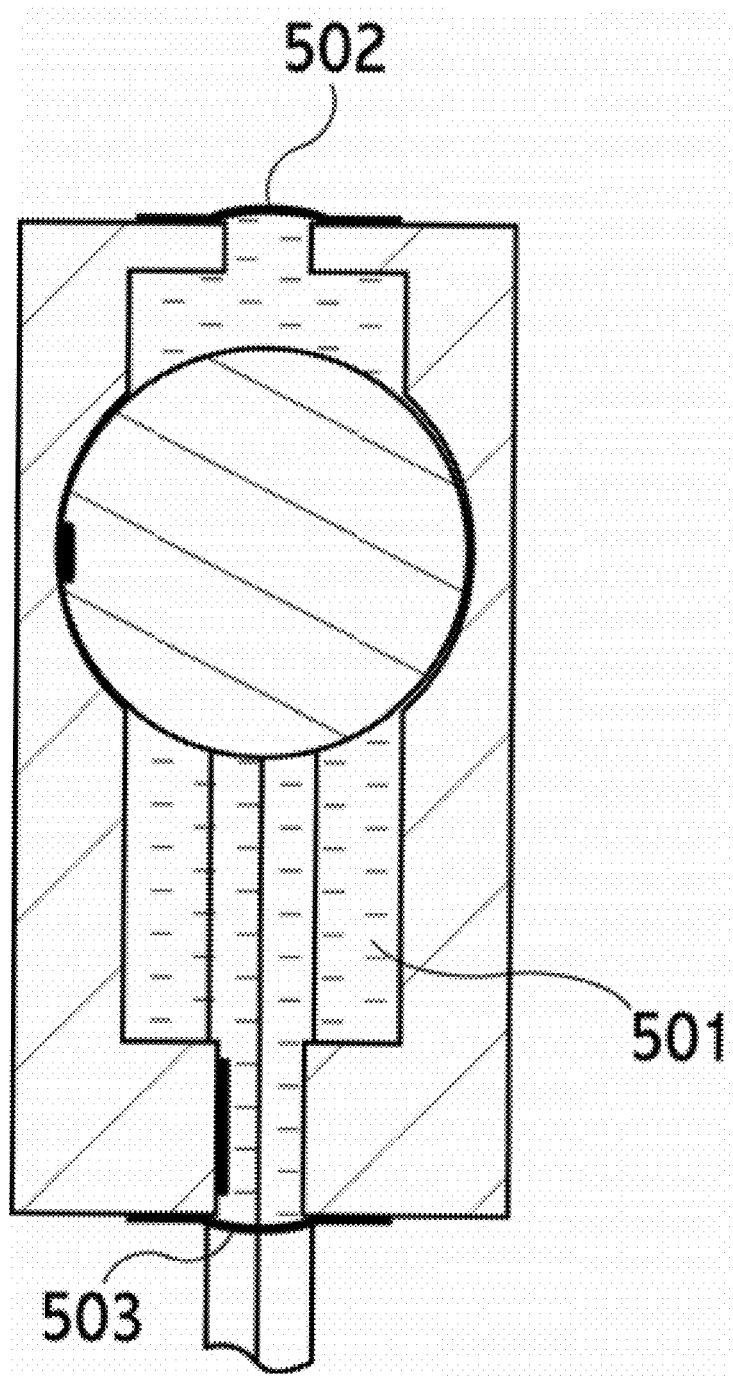
FIG. 5 is a cross-sectional view of a seventh embodiment of a load cell constructed in accordance with the present invention.

In another embodiment of the present invention, encapsulation is provided by a thermally conductive liquid, such as water as illustrated in FIG. 5. The liquid 501 is retained inside the load cell by thin flexible membranes 502 and 503.

Figure 6:
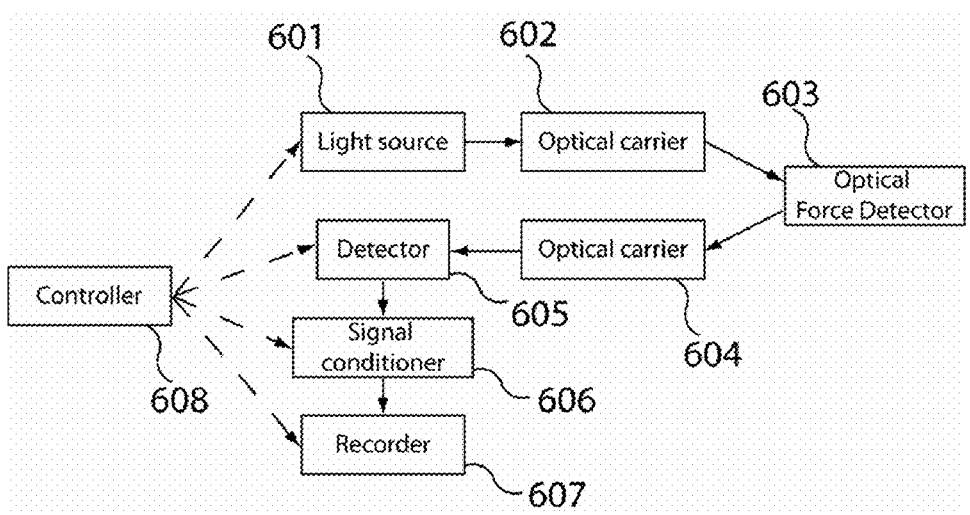
FIG. 6 is a schematic diagram of a system, constructed in accordance with the present invention, for measuring a mechanical force based on a shift of optical resonances of a micro-resonator.

Referring to FIG. 6, a system, constructed in accordance with the present invention, for measuring force based on a shift of optical resonances of a micro-resonator includes a narrowband tunable light source 601 (e.g., a tunable diode laser), an input optical carrier 602 (e.g., an optical fiber), an optical force detector 603 (e.g., optical micro-resonator 101, base plate 104 and cover member 105), an output optical carrier 604 (e.g., an optical fiber), a detector 605 (e.g., a photodiode), a signal conditioner 606 (e.g., a photodiode amplifier), a data recorder 607 (e.g., a computer with a data acquisition card), and a controller 608 (e.g., a computer with appropriate software).

Light from narrowband tunable light source 601 is directed through input optical carrier 602 to optical force detector 603. The light from narrowband tunable light source 601, ramped within a predetermined range of wavelengths, is introduced, via input optical carrier 602, to the optical micro-resonator of optical force detector 603. A mechanical force, applied to optical force detector 603, changes the shape and the index of refraction of the optical micro-resonator of the optical force detector, resulting in a shift of the WGM resonance of the optical micro-resonator. Light emanating from the optical micro-resonator of optical force detector 603 is coupled to output optical carrier 604 and passes through the output optical carrier to detector 605. Detector 605 develops an electrical signal, the strength of which is related to the light intensity, that is conditioned by signal conditioner 606 and is recorded and stored by recorder 607. The WGM spectrum is recorded when the light wavelength is swept from the preset minimum to the preset maximum. Operation of narrowband tunable light source 601, detector 605, signal conditioner 606, and recorder 607 is synchronized and controlled by controller 608 of conventional construction and operation.

The shift of the resonance of the WGM spectrum, resulting from a force applied to optical force detector 603, can be determined by comparing the WGM spectrum recorded by recorder 607 after the application of the force with a WGM spectrum recorded before the application of the force. Such a resonance shift can be related to the applied force by a calibration curve.

Figure 7:
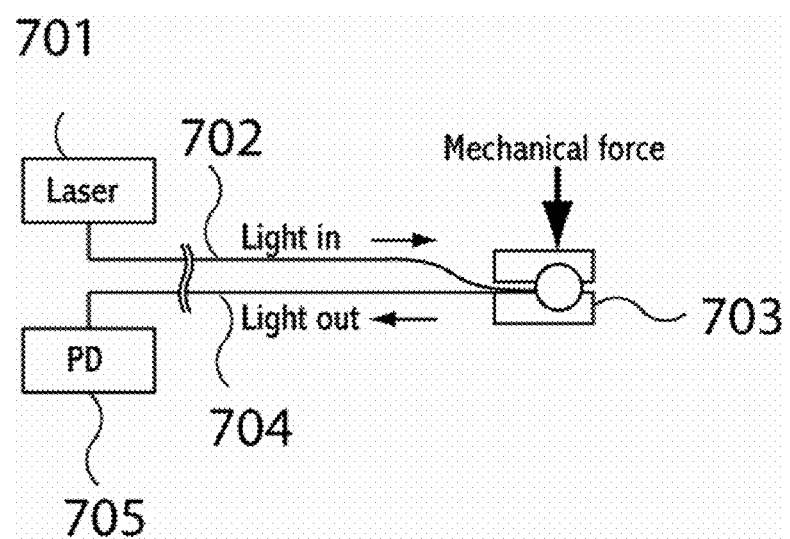
FIG. 7 is a schematic diagram of the components of an optical circuit, constructed in accordance with the present invention, for measuring a mechanical force based on a shift of optical resonances of a micro-resonator.

Referring to FIG. 7, an optical circuit, constructed in accordance with the present invention, for measuring force based on a shift of optical resonances of a micro-resonator includes a light source 701 (e.g., a diode laser) from which light is transmitted through an input optical carrier 702 (e.g., an optical fiber) to an optical force detector 703 (e.g., optical micro-resonator 101, base plate 104 and cover member 105). Light emanating from optical force detector 703 is conducted to a detector 705 (e.g., a photodiode) by output optical carrier 704.

Figure 8:
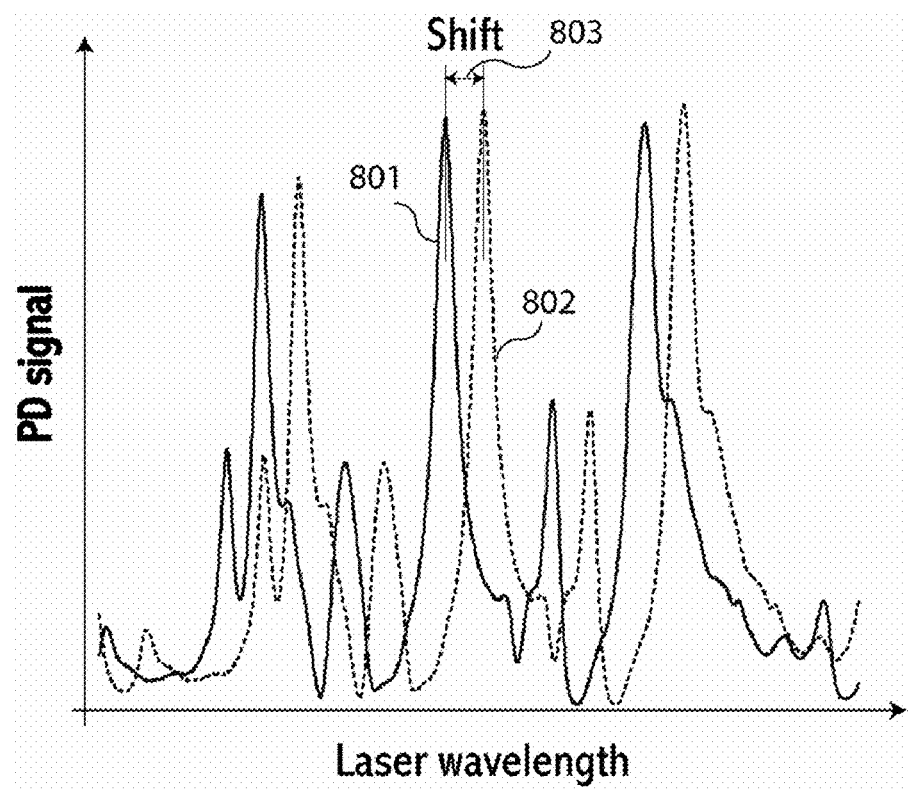
FIG. 8 illustrates a shift of optical resonances of an optical micro-resonator as a mechanical force is applied to the optical micro-resonator.
Figure 9:
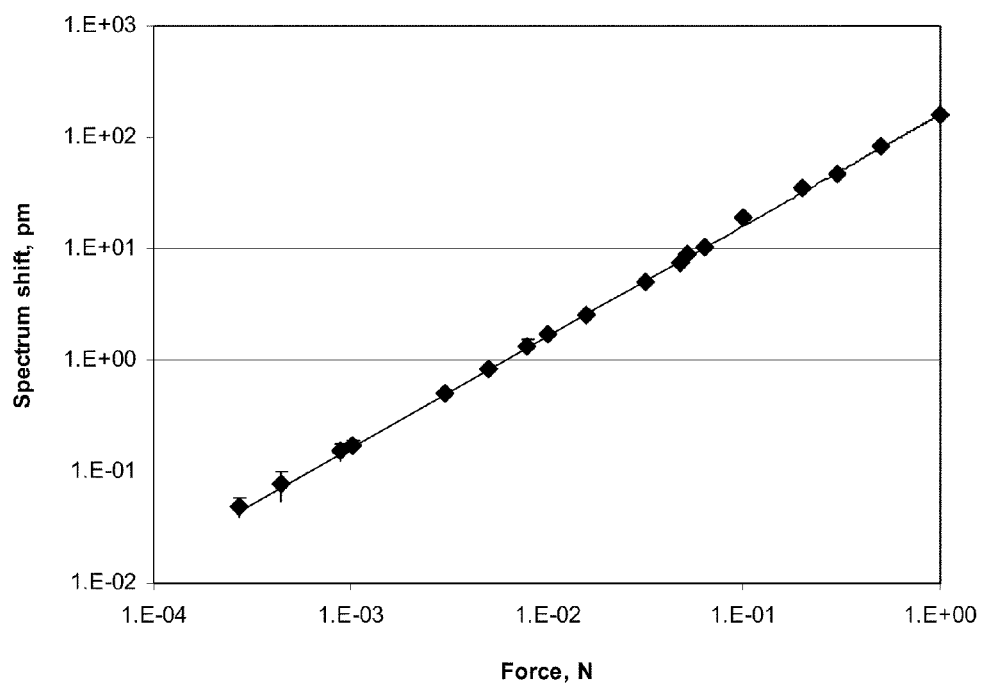
FIG. 9 is a graph that presents an exemplary measurement of the force vs. shift of the optical resonances of an optical micro-resonator.

Two examples of measured WGM spectra are presented in FIG. 8. Spectrum 801 represents no force being applied to cover member 105 of the load cell and spectrum 802 represents a force being applied to the cover member of the load cell. Force transferred by cover member 105 to optical micro-resonator 101 that changes the shape and index of refraction of the micro-resonator leads to the WGM spectrum shift 803. The applied force is determined by measuring the magnitude of the spectrum shift and using a sensor calibration curve. An example of a calibration curve is given in FIG. 9.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A load cell comprising:
    a base plate formed of a high thermally conductive material;
    a cover member formed of a high thermally conductive material with:
    (a) a first end of said cover member secured to a first end of said base plate, and
    (b) a second end of said cover member, opposite from said first end of said cover member, spaced from a second end of said base plate opposite from said first end of said base plate
    for relative pivotal movement between said cover member about the point said first end of said base plate and said first end of cover member are secured together in response to a force applied to said cover member;
    an optical micro-resonator, disposed between and in intimate contact with said base plate and said cover member, that changes in shape, refractive index and resonant frequency in response to a force applied to said cover member; and optical carrier means for:
(a) introducing light having a spectrum of wavelengths to said optical micro-resonator, and
(b) providing an indication of a shift in the spectrum of wavelengths of the light caused by a change in the resonant frequency of said optical micro-resonator.

2. A load cell according claim 1 further including a flexible material in the space between said second end of said base plate and said second end of said cover member.

3. A load cell according claim 1 wherein said optical carrier means include:
(a) a first optical carrier for introducing to said optical micro-resonator light having a first spectrum of wavelengths, and
(b) a second optical carrier for collecting from said optical micro-resonator light having a second spectrum of wavelengths.

4. A load cell comprising:
a base plate formed of a high thermally conductive material;
a cover member formed of a high thermally conductive material and movable relative to said base plate in response to a force applied to said cover member;
an optical micro-resonator, disposed between and in intimate contact with said base plate and said cover member, that changes in shape, refractive index and resonant frequency in response to a force applied to said cover member;
optical carrier means for:
(a) introducing light having a spectrum of wavelengths to said optical micro-resonator, and
(b) providing an indication of a shift in the spectrum of wavelengths of the light caused by a change in the resonant frequency of said optical micro-resonator; and
means for sensing ambient temperature in the proximity of said optical micro-resonator to compensate for spectrum shift in said optical micro-resonator due to the influence of the ambient temperature.

5. A load cell according to claim 4 wherein said means for sensing the environmental factor ambient temperature include a micro-resonator.

6. A load cell comprising:
a base plate formed of a high thermally conductive material;
a cover member formed of a high thermally conductive material and movable relative to said base plate in response to a force applied to said cover member;
an optical micro-resonator, disposed between and in intimate contact with said base plate and said cover member, that changes in shape, refractive index and resonant frequency in response to a force applied to said cover member;
an high thermally conductive encapsulating material disposed between said micro-resonator and said base plate and said cover member in areas where said micro-resonator and said base late and said cover member are not in direct intimate contact; and
optical carrier means for:
(a) introducing light having a spectrum of wavelengths to said optical micro-resonator, and
(b) providing an indication of a shift in the spectrum of wavelengths of the light caused by a change in the resonant frequency of said optical micro-resonator, and an additional high thermally conductive encapsulating material disposed between said micro-resonator and said base plate and said cover member in areas where said micro-resonator and said base plate and said cover member are not in direct intimate contact.

7. A load cell according to claim 6 wherein said additional encapsulating material is a thermally conductive liquid.

8. A load cell according to claim 6 wherein said additional encapsulating material is a thermally conductive polymer.

9. A load cell comprising:
an optical micro-resonator that changes in shape, refractive index and resonant frequency in response to a force applied to the load cell;
a housing formed of high thermally conductive material containing said micro-resonator and having:
(a) a base plate having an inside surfaces in intimate contact with said optical micro-resonator, and
(b) a cover member:
(1) in intimate contact with said micro-resonator,
(2) disposed opposite from said base plate, and
(3) movable relative to said base plate in response to a force applied to said cover member;
a high thermally conductive encapsulating material disposed between said micro-resonator and said base plate and said cover member in areas where said micro-resonator and said base plate and said cover member are not in direct intimate contact; and
optical carrier means for:
(a) introducing light having a spectrum of wavelengths to said optical micro-resonator, and
(b) providing an indication of a shift in the spectrum of wavelengths of the light caused by a change in the resonant frequency of said optical micro-resonator.

10. A load cell according to claim 9 wherein said additional encapsulating material is a thermally conductive liquid.

11. A load cell according to claim 9 wherein said additional encapsulating material is a thermally conductive polymer.

12. A system for measuring a force comprising:
a load cell including:
(a) an optical micro-resonator that changes in shape, refractive index and resonant frequency in response to a force applied to the load cell,
(b) a housing formed of high thermally conductive material containing said micro-resonator and having:
(1) inside surfaces in intimate contact with said optical micro-resonator, and
(2) an outside surface against which a force to be measured is applied, and
(c) optical carrier means for:
(1) introducing light having a spectrum of wavelengths to said optical micro-resonator, and
(2) providing an indication of a shift in the spectrum of wavelengths of the light caused by a change in the resonant frequency of said optical micro-resonator;
a light source for supplying light having a ramped wavelength to said optical carrier means;
a detector for receiving light from said optical carrier means for producing an electrical signal representative of the intensity of the light received from said optical carrier means; and
means for recording the intensity of the light received from said optical carrier means.

13. A system for measuring a force comprising:
a load cell including:
(a) a base plate formed of a high thermally conductive material,
(b) a cover member formed of a high thermally conductive material with:

(1) a first end of said cover member secured to a first end of said base plate, and
(2) a second end of said cover member, opposite from said first end of said cover member, spaced from a second end of said base plate opposite from said first end of said base plate
for relative pivotal movement between said cover member about the point said first end of said base plate and said first end of cover member are secured together in response to a force applied to said cover member;
(c) an optical micro-resonator, disposed between and in intimate contact with said base plate and said cover member, that changes in shape, refractive index and resonant frequency in response to a force applied to said cover member, and
(d) optical carrier means for:
(1) introducing light having a spectrum of wavelengths to said optical micro-resonator, and
(2) providing an indication of a shift in the spectrum of wavelengths of the light caused by a change in the resonant frequency of said optical micro-resonator;
a light source for supplying light having a ramped wavelength to said optical carrier means;
a detector for receiving light from said optical carrier means for producing an electrical signal representative of the intensity of the light received from said optical carrier means; and
means for recording the intensity of the light received from said optical carrier means.

14. A load cell comprising:
a base plate formed of a high thermally conductive material;
a cover member formed of a high thermally conductive material with:
(a) a first end of said cover member secured to a first end of said base plate, and
(b) a second end of said cover member, opposite from said first end of said cover member, spaced from a second end of said base plate opposite from said first end of said base plate
for relative pivotal movement between said cover member about the point said first end of said base plate and said first end of cover member are secured together in response to a force applied to said cover member;
a first optical micro-resonator, disposed between and in intimate contact with said base plate and said cover member, that changes in shape, refractive index and resonant frequency in response to a force applied to said cover member;
a second optical micro-resonator embedded in said base plate;
first optical carrier means for:
(a) introducing light having a spectrum of wavelengths to said first optical micro-resonator, and
(b) providing an indication of a shift in the spectrum of wavelengths of the light caused by a change in the resonant frequency of said first optical micro-resonator; and
second optical carrier means for:
(a) introducing light having a spectrum of wavelengths to said second optical micro-resonator, and
(b) providing an indication of a shift in the spectrum of wavelengths of the light caused by a change in the resonant frequency of said second optical micro-resonator.

\* \* \* \* \*

UNITED STATES PATENT AND TRADEMARK OFFICE
CERTIFICATE OF CORRECTION

| | | |
|---|---|---|
| PATENT NO. | : 8,028,586 B2 | Page 1 of 1 |
| APPLICATION NO. | : 12/464547 | |
| DATED | : October 4, 2011 | |
| INVENTOR(S) | : Valery A. Sheverev and Vadim Stephaniuk | |

It is certified that error appears in the above-identified patent and that said Letters Patent is hereby corrected as shown below:

In claim 5, column 7, line 43, "sensing the environmental factor ambient temperature" should read -- sensing the ambient temperature --.

Signed and Sealed this
Sixth Day of December, 2011

David J. Kappos
*Director of the United States Patent and Trademark Office*